United States Patent [19]

LaBaw et al.

[11] Patent Number: 4,784,867
[45] Date of Patent: Nov. 15, 1988

[54] PROCESS FOR PREPARING FOOD PRODUCT WITH FOOD BINDER COMPOSITION

[75] Inventors: Glenn D. LaBaw, Greenwich; Stephen E. Meyer, Wilton, both of Conn.

[73] Assignee: Nabisco Brands, Inc., Parsippany, N.J.

[21] Appl. No.: 842,753

[22] Filed: Mar. 21, 1986

Related U.S. Application Data

[63] Continuation of Ser. No. 540,643, Oct. 11, 1983, abandoned.

[51] Int. Cl.⁴ .............................................. A23G 3/00
[52] U.S. Cl. ................................... 426/309; 426/613; 426/615; 426/618; 426/632; 426/660
[58] Field of Search ............... 426/613, 660, 623, 93, 426/103, 615, 618, 309

[56] References Cited

U.S. PATENT DOCUMENTS

| | | | |
|---|---|---|---|
| 3,295,992 | 1/1967 | Frey | 426/660 |
| 3,336,139 | 8/1967 | Mech et al. | 426/573 |
| 3,431,112 | 4/1969 | Durst | 426/89 |
| 3,506,447 | 4/1970 | Billerbeck et al. | 426/639 |
| 3,692,542 | 9/1972 | Walon | 426/660 X |
| 3,711,295 | 1/1973 | Zukerman | 426/618 |
| 3,821,443 | 6/1974 | Halladay et al. | 426/93 |
| 3,830,941 | 8/1974 | Luft et al. | 426/177 |
| 3,840,685 | 10/1974 | Lyall et al. | 426/201 |
| 3,868,471 | 4/1973 | Decelles et al. | 426/303 |
| 3,876,811 | 4/1975 | Bonner et al. | 426/93 |
| 3,903,308 | 9/1975 | Ode | 426/93 |
| 3,953,611 | 4/1975 | Youngquist et al. | 426/93 |
| 4,000,323 | 12/1975 | Youngquist | 426/93 |
| 4,038,423 | 7/1977 | Hayward et al. | 426/72 |
| 4,038,427 | 7/1977 | Martin | 426/285 |
| 4,055,669 | 10/1977 | Kelly et al. | 426/93 |
| 4,061,784 | 12/1977 | Youngquist | 426/93 |
| 4,061,790 | 12/1977 | Cole, Jr. | 426/303 |
| 4,117,176 | 9/1978 | Taylor et al. | 426/660 |
| 4,145,448 | 3/1979 | Hayward et al. | 426/72 |
| 4,250,195 | 2/1981 | Cherukuri et al. | 425/5 |
| 4,289,790 | 9/1981 | Bruelle | 426/93 |
| 4,379,171 | 4/1983 | Furda et al. | 426/291 |
| 4,410,555 | 10/1983 | Richardson | 426/660 X |
| 4,450,179 | 5/1984 | Vink et al. | 426/660 X |
| 4,451,488 | 5/1984 | Cook et al. | 426/89 |

FOREIGN PATENT DOCUMENTS

0005141 1/1983 Japan .................................. 426/660

OTHER PUBLICATIONS

Roth, J., "Old-Fashioned Candymaking", Henry Regnery Co., Chicago, Ill., 1974, pp. 148-149.
Alikonis, J. J., "Candy Technology", Avi. Publ. Co. Inc., Westport, Conn., 1979, pp. 247 and 270.
Richmond, W., "Choice Confections", Manufacturing Confectioner Publ. Co., Oak Park, Ill., 1954, pp. 208-221.

Primary Examiner—Donald E. Czaja
Assistant Examiner—Celine T. Callahan
Attorney, Agent, or Firm—Richard Kornutik

[57] ABSTRACT

An edible composition is provided which is useful for binding solid food ingredients such as nuts, fruit, cereals and the like into flexible, moist bars. The binder composition comprises about 5–10% water, about 15–30% fat, and a mixture of sucrose and partially caramelized non-crystallizing sugar in a weight ratio of about 1:0.8–3.

3 Claims, No Drawings

PROCESS FOR PREPARING FOOD PRODUCT WITH FOOD BINDER COMPOSITION

This application is a continuation of application Ser. No. 540,643, filed Oct. 11, 1983, now abandoned.

BACKGROUND OF THE DISCLOSURE

In recent years, mixtures of nutmeats, cereals and/or dried or sugar-infused fruits have become popular as snacks or quick energy foods. Mixtures which contain nuts, cereals, such as granola, and fruit are commonly referred to as trail mixes or trail mixtures. Due to difficulties associated in packaging and preserving such loose mixtures of differently textured and sized ingredients, methods have been sought to bind the various ingredients into food bars which are convenient to handle and consume and which may be easily packaged, shipped and displayed.

One form of this food product is the nut bar which typically consists of nutmeats bound together by an edible matrix. The most common matrix for this type of food bar is formed almost entirely of sucrose which is applied to the nuts as a syrup and which becomes crystalline upon evaporation of the water. Such bars thus rapidly develop a crunchy, crisp texture upon storage.

Another form of a ready-to-eat food bar is the granola bar which typically consists of a major portion of granola, e.g., rolled oats and/or wheat, and minor amounts of fruit and/or nuts. These bars are commonly cemented by a baked cookie-type matrix comprising crumbs of the cereal product saturated with sugar and vegetable oils. Similar bars replace a part or all of the granola with other processed cereals such as puffed wheat or rice. These bars are typically dry and friable in texture. Such fat-occluded food compositions are disclosed in U.S. Pat. No. 4,055,669.

On the opposite range of the textual scale are gelatin-based marshmallow-type matrices such as those disclosed in U.S. Pat. No. 4,145,448 which may be used to bind cereal products and vitamins. Such products are spongy and sticky in texture, and do not possess optimal binding properties for ranch-mix type products.

Ranch mixes typically comprise whole or halved nutmeats and large fruit fragments. Due to the larger size and weight of these materials, the physical properties of the binder required to firmly join them into a flexible bar must be carefully adjusted.

Therefore, it is an object of the present invention to provide an edible binder for mixtures of nuts, fruits and/or cereal pieces which allows such mixes, e.g., trail mixes, to be bound into bars.

It is a further object of the present invention to provide a binder composition which acts to bind trail mix ingredients into a flexible, elastic bar without imparting undue stickiness to the bound mixture.

It is yet another object of the present invention to provide a binder composition which will preserve the moistness and biologically stabilize a mixture of fruits, nuts and cereal.

It is yet another object of the present invention to provide a plastic binder composition which is a suitable matrix for food bars comprising large, e.g., whole or halved, nutmeats.

BRIEF DESCRIPTION OF THE INVENTION

The objects of the present invention are attained by binding a ranch-type mix in a matrix of a particularly compounded and treated mixture of fat, sugars, water, and, optionally, a polyhydric alcohol. The sugar component of the binder mixture will comprise a mixture of partially caramelized, crystallization-resistant sugars and sucrose, a sugar which, if used alone, would readily crystallize under the conditions of bar formation and storage. All percentages given represent weight percents unless otherwise noted. As used herein with respect to the binder compositions, the term sugar or noncrystallizing sugar is intended to include both uncaramelized sugars and the products of sugar caramelization.

The binder compositions of the present invention are prepared by:

(a) forming a substantially homogeneous aqueous mixture of about 10–30% sucrose, at least one non-crystallizing sugar which is caramelizable at a temperature below about 300° F., and fat in a weight ratio to total sugar solids of about 1:1.5–5;

(b) heating said mixture to a temperature sufficient to at least partially caramelize the caramelizable non-crystalline sugar without caramelizing the sucrose;

(c) cooling the heated mixture to room temperature to provide a binder composition which is plastically deformable and substantially non-crystalline.

In one preferred embodiment, the present process for preparing binder compositions comprises:

(a) forming a premix of about 15–25% sucrose, about 17–30% of an about 28–75 D.E. corn syrup; about 10–15% honey, about 0.25–1.5% lecithin, about 15–25% water and about 3–7% glycerin;

(b) heating said premix to about 88°–102° F.;

(c) adding about 10–15% of plastic shortening to the heated premix; and (d) heating the fat-containing premix to about 240°–270° F., for a period of time sufficient to reduce the water content of the premix to about 5–10% and to partially caramelize the non-crystallizing sugars, to provide a homogeneous binder composition which is plastically deformable and substantially non-crystalline at room temperature.

The resultant binder mixture will comprise a substantially homogeneous blend of about 5–10% water, sugar and about 15–30% fat, wherein the ratio of fat to sugar is about 1:1.5–5, the sugar component comprising non-caramelized sucrose and one or more partially caramelized non-crystallizing sugars wherein the weight ratio of sucrose to non-crystallizing sugar is about 1:0.8–3.0. The composition is non-tacky, plastic and is substantially non-crystalline at room temperature, e.g., at about 65°–75° F.

As used herein, the term "plastic" refers to a composition which is plastically deformable at room temperature, e.g., which offers flexible resistance to a solid probe, deforming rather than breaking or running. At ambient temperatures (65°–75° F.), a body of one of the present compositions would preferably require a pressure of from about 0.15–3 kg/cm$^2$, most preferably about 0.18–2.5 kg/cm$^2$ to deform it to the extent of about 50%. The resistance of the compositions described herein to deformation increases as the temperatures employed to reduce the water content of the premix are increased.

The compositions of the present invention are ideally suited to bind ranch-mixes of solid particulate ingredients into food bars. As used herein, the phrase "ranch mix" or "ranch mixture" refers to a loose mixture of a major portion of nutmeats in combination with fruit, e.g., dehydrated or infused whole fruit or fruit pieces, and a processed cereal such as granola. Bars comprising nutmeats as the sole particulate food additive may also readily be prepared using the present binders. Preferably whole, halved or chopped nutmeats will comprise at least about 35–50% of the total solid ingredients incorporated into the present bars, and are typically used in combination with a mixture of about equal amounts of fruit and cereal, since it has been found that such mixtures provide an attractive blend of tastes and textures, as well as being desirable from a nutritional standpoint.

To form the food bars of the present invention, a mixture of solid ingredients is added to a binder mixture at the point at which the water level of the binder has been reduced to the desired level and the binder has been partially caramelized but the caramelized mixture has not yet been cooled to room temperature. Upon cooling to room temperature, a mixture of solid ingredients in a plastic matrix is obtained which is firmly but flexibly bound and which retains its initial mixture of chewy and/or crisp textures for extended periods of storage.

DETAILED DESCRIPTION OF THE INVENTION

To prepare the present binder compositions, a premix is first formed which incorporates a sugar mixture of non-crystallizing sugars and sucrose, which preferably comprises about 10–30% by weight sucrose, preferably about 15–25%. The sucrose may be incorporated in any convenient form, but for purposes of the present invention, brown sugar is preferred due to its characteristic flavor. However, confectioner's sugar, granular cane sugar or the like may also be employed. After most of the water has been evaporated by the heating step, the binder will comprise about 15–35% sucrose, preferably about 20–30% sucrose which will not have been structurally altered by caramelization reactions.

The tendency of sucrose to crystallize out of the binder mixture as it is cooled as to thus render the finished bars brittle and hard is counteracted by the addition to the binder mixture of about 5–25%, preferably about 10–20% of one or more non-crystallizing sugars. These sugars bind water and are non-crystallizable or only slowly crystallizable relative to sucrose, and function to inhibit sucrose crystallization under the conditions of bar formation and storage. Such non-crystallizing sugars include fructose, dextrose, maltose, invert sugar, high fructose corn syrups, high D.E. corn syrups, honey, low molecular weight saccharides and the like. The sugar component of the binder may comprise an about 28–75 D.E. corn syrup or blends of various corn syrups. The non-crystallizing sugars employed may comprise at least about 15% and above of the total sugar component.

Of the noncrystallizing sugars, fructose, dextrose and mixtures thereof are preferred, and may be provided by a number of sources. A 42 D.E. corn syrup useful in the practice of this invention may have a water content of about 19.7% and a total sugar solids content of about 80.3% (18.5% dextrose, 13.9% maltose, 11.6% trisaccharides and 56% higher saccharides). An equivalent amount of 36 D.E. corn syrup may also be used (79.9% solids; 14.1% dextrose; 11.7% maltose plus 74.2% higher saccharides). Such syrups are available under the designation Cornsweet ® from ADM Foods, Cedar Rapids, Iowa. A useful high fructose-dextrose syrup comprises 23.5% water and the remainder 55% fructose and 45% dextrose. A fructose concentrate suitable for use herein is an aqueous syrup having 80% sugar of which 90% is fructose and 10% is dextrose. Lower D.E. corn syrups or corn syrup solids may also be employed in some cases. Corn syrups will typically comprise about 17–30% of the binder mixture prior to heating.

Natural or synthetic honey is another preferred source of crystallization-resistant sugars and typically comprises about 62–83% invert sugar, 0–8% sucrose and 0.26–7% dextrin. When honey is employed it will typically comprise about 10–15% of the binder mixture prior to heating. For example, an about 1:1.5–2.5 ratio of honey to an about 30–50 D.E. corn syrup will be employed in the binder premix to provide the non-crystallizing sugar component.

In the practice of the present invention, the binder composition's ingredients minus the fat are mixed together and heated to about the melting point of the fat, at which point the fat is added. The temperature of the fat-containing premix is then raised, preferably to about 230°–290° F. The initial water content of the premix is about 15 to about 40%, preferably about 20–35%. The amount of water initially added and the heating conditions are adapted to reduce the water content of the premix to about 5–10%, preferably 4–8% by weight of the mixture. The finished bars possess a similar weight percent of water which functions, along with the high sugar content, to lower the water activity of the bars and to render them resistant to microbial spoilage. The heating process also partially caramelizes the non-crystallizing sugars to an extent sufficient to permit the binder to effectively bind the mixed-in solids upon cooling to room temperature.

To achieve the desired physical properties in the binder compositions, the premix of ingredients is heated under controlled conditions so as to partially caramelize the non-crystallizing sugars which are present while leaving the sucrose in a noncaramelized state. It has been found that when premixes comprising the percentages of sugar and water as described above are heated to about 230°–290° F. for a period of time sufficient to reduce their water contents to about 5–10%, the selective caramelization of the non-crystallizing sugars occurs to the desired extent.

The chemical changes which occur when sugars caramelize involve molecular rearrangements and polymerizations which are not readily susceptible to precise description. For example, fructose rapidly caramelizes at temperatures above about 260° F. whereas sucrose remains relatively unaltered until heated above about 300° F. Such processes will effect the color, viscosity and plasticity of the finished binder mixture, imparting thereto physical characteristics such as are commonly associated with caramel confections. In preferred embodiments, bodies of the finished binder compositions of the present invention will require a pressure of about 0.15–3 kg/cm$^2$, preferably about 0.175–2.5 kg/cm$^2$ pressure to plastically deform them to the extent of about 50% under ambient temperatures and humidities.

Such compositions act to firmly coat and bind relatively large, nonporous food particles such as nutmeats. The resultant mixtures can be facilely shaped into bars, cylinders and the like which retain their structural integrity and remain moist and flexible for long periods of time. These desirable effects are believed to be due at least in part to the relationship which is achieved between the water activity of the binder composition and the water activity of the nut and fruit pieces which are bound therewith. Preferably, the water content of the binder will be about 2-4% higher than the average water content of the solid ingredients used.

The finished ranch-mix bars are both elastic and flexible. As used herein the term elastic is measured in terms of the tensile strength of the binder matrix of the bar, e.g. the force required to completely separate two adjacent solid fragments and draw the connective binder into a thin plastic thread. When measured in this fashion, the Instron ® elasticity of the bars will generally fall within the range of about $0.1-0.6$ kg/cm$^2$, preferably about $0.15-0.5$ kg/cm$^2$ as measured at ambient temperatures and humidities.

As used herein the term flexibility relates to the ability of the present bars to bend from a planar configuration without breaking. The flexibility of the present bars is measured in terms of the force required to bend the bars with a centrally-placed wedge until they break. Preferably finished bars about 1.25 inches thick and having a ratio of binder to solids of about 1:1-3 will require a force of from about 5-20 Kg, preferably about 6-17.5 Kg to be bent to the breaking point, the larger forces representing greater flexibility. It has been found that the more acidic fruits such as apricots and pineapple tend to decrease the flexibility and elasticity of the binder matrix when incorporated into bars under otherwise similar formation conditions.

Although the sugar-water mixture described above will largely contribute the necessary elasticity and flexibility to the finished trail mix bar, it has been found that mixture of fat and emulsifier is necessary to fully realize certain desirable features of the ranch mix bars, namely to reduce the stickiness of the bars so that they may be conveniently handled and packaged. To this end the binder mixture will comprise, prior to caramelization, about 7-30%, preferably about 10-25% of a fat which will be solid at storage conditions commonly encountered by the bars, and preferably fat having a Wiley Melt Point close to that of body temperature, e.g., within the range of about 88°-102° F., most preferably about 90°-100° F. Suitable shortenings are obtained by partially hydrogenating naturally-occurring liquid glyceride oils such as cottonseed oil, soybean oil, safflower oil, corn oil, olive oil, coconut oil, peanut oil, rapeseed oil, sesame seed oil, sunflower seed oil and mixtures thereof. Typically, the fat component will consist of a plastic shortening, e.g., a mixture of partially hydrogenated soybean, palm kernel or cottonseed oils. Some preferred fats are the SP-2 and SP-3 fractionated lauric hard butters (Stokely Van-Camp, Columbus, Ohio). Reduction of the fat content to as low as about 6-7% will provide an acceptable binder mixture, even though the reduction in tackiness is not optimal. The finished binder composition will preferably comprise about 15-30% fat preferably about 17-25% fat, the ratio of fat to sugar solids in the binder mixture will be about 1:1.5-5, preferably about 1:2-4.

The present binder compositions will also comprise a minor but effective amount of an emulsifier which functions to homogeneously disperse the fat in the water present in the mixture. An especially preferred emulsifier is lecithin, its edible derivatives or related purified phospholipids. About 0.125-2% of emulsifier may be employed in the present binder compositions; about 0.25-1.5% lecithin is preferred.

One or more edible polyhydric alcohols are also optionally incorporated into the present binder composition in order to enhance the water-binding properties of the finished bar and to improve mouth feel. Useful polyhydric alcohols include diols and polyols such as propylene glycol, sorbitol and glycerol. Preferred materials are stable diols or triols which may be readily emulsified and combined with the present binder compositions. Of the polyhydric alcohols useful in the present formulations, glycerol is preferred and will preferably be present at a concentration of about 2-10%, preferably about 3-7% by weight.

Minor but effective amounts of coloring and flavoring may be added to the binder mixture, preferably prior to the addition of the solid ingredients, at the point when heating is discontinued. Suitable flavorings include salt, chocolate, caramel, cocoa, coffee, vanilla, cinnamon, fruit flavorings or essences and the like. Additives which supplement the protein content of the finished bar such as non-fat milk solids, casein, whey, soy concentrates and protein hydrolysates may also be added in appropriate amounts.

After the combination of binder ingredients has been heated to 230°-290° F. for a period of time sufficient to partially caramelize the non-crystallizing sugars and to lower the water content to the desired level, a dry premix of solid ingredients is added to the hot mixture. Suitable solid ingredients are typically selected from the group consisting of nuts, processed cereals, fruits and mixtures thereof. Characteristic nutmeats useful in the invention will include peanuts, macadamia nuts, walnuts, cashews, almonds, textured vegetable bean extracts or legumes, sesame seeds, sunflower nutmeats, coconut and/or hazelnuts. Typically used fruit will include sugar-infused or otherwise dehydrated pineapple, cherries, peaches, apples, raisins, blueberries, raspberries, citron, apricots, bananas, pears and the like. Useful cereal products include flaked, puffed or otherwise processed wheat, rice, corn, buckwheat, oats and the like. Granola is a preferred cereal product for use with the present binder composition as its loose combination with peanuts and raisins has long been recognized as an acceptable trail mix. Preferred bars may comprise about 15-35% nuts in combination with about 5-25% fruit and 15-25% processed cereal; for example about 20-30% peanuts, almonds or walnuts, about 17-24% granola and about 5-20% apricots, raisins, pineapple or dehydrated apples.

The weight ratio of such solid food additives to the binder matrix may be widely varied. Preferably the final bar ratio of binder to solids will fall within the range of about 1:1-3, preferably about 1:1.25-2.5.

To prepare the ranch-mix bars of the present invention, the solid ingredients are dry-blended in a suitable mixer. The temperature of a sugar/water premix is raised to the melting point of the fat component which is then added. The temperature of the liquid mixture is raised to about 230°-290° F., preferably about 240°-270° F. At this temperature, the moisture level is reduced to about 4-6% and the mixture is partially caramelized. This both effectively stabilizes the mixture against microbial degradation and increases its binding power, e.g. its plasticity. The mixture of solids is then added to the hot binder and the hot, flowable mixture flattened into bars or another suitable form and cooled in order to set the binder. The cooled bars are then cut, if necessary, further cooled and separated.

The invention will be further illustrated by the following examples which are not intended as limitations thereon.

EXAMPLE 1

Binder mixtures were prepared using the ingredients listed on Table I.

TABLE I

| | BINDER MIXTURES | | | |
|---|---|---|---|---|
| | A | | B | |
| Ingredient | g/batch | Wt. % | g/batch | Wt. % |
| 42 D.E. Corn Syrup | 45.0 | 23.9 | 35.0 | 21.0 |
| Honey | 22.0 | 11.9 | 22.5 | 12.8 |
| Brown Sugar | 45.0 | 23.9 | 35.0 | 21.0 |
| Fat | 30.0[1] | 15.9 | 35.0[2] | 21.0 |
| Lecithin | 1.1 | 0.6 | 1.1 | 0.6 |
| Water | 35.0 | 18.6 | 35.0 | 21.0 |
| Salt | 2.25 | 1.2 | 1.28 | 0.75 |
| Glycerin | 7.4 | 3.9 | 4.2 | 2.5 |

[1] SP-3 Fractionated Lauric Hard Butter (Stokely Van-Camp, Columbus, Ohio); partially hydrogenated palm kernel and soybean oil, Wiley Melting Pt. 96–99° F.; 68% solids at 50° F.; 8.0% solids at 92° F.
[2] SP-2 Fractionated Lauric Hard Butter (Stokely Van-Camp); Wiley Melting Pt. 91–94° F.; 70% solids at 50° F.; 6% solids at 92° F.

To prepare the ranch-mix bars of the present invention, the ingredients of Table I, Col. A or B minus the fat were first blended in a steam-jacketed kettle and heated to 100° F. with continuous mixing to form a premix. As the temperature of the mixture rose over 100° F., the fat component was added. When the binder temperature reached 260° F. (260° F. for apple-containing products) a mixture of any one of the solid ingredient groups listed on Table II was added with gentle blending and heating was discontinued.

If binder A was cooled to room temperature without the addition of solid ingredients, a non-tacky plastic, caramel-like body was obtained which exhibited an Instron® texture (plasticity) of 0.53 (kg) and 4.8 (kg) respectively as measured for the samples prepared at 250° F. and 260° F., respectively (3 cm×1 cm bars compressed with 3.6 cm² probe to a one-half cm height (50% deformation).

TABLE II

| | SOLID ADDITIVES | | | | | |
|---|---|---|---|---|---|---|
| | A | | B | | C | |
| Ingredient | g/batch | Wt. % (bar) | g/batch | Wt. % (bar) | g/batch | Wt. % (bar) |
| Raisins | 88.6 | 18.3 | — | — | | |
| Peanuts | 118.0 | 24.4 | — | — | | |
| Granola | 88.6 | 18.3 | 88.6 | 18.9 | 88.65 | 21.7 |
| Apricots[1] | — | — | 88.6 | 18.9 | — | |
| Almonds | — | — | 118.6 | 25.3 | — | |
| Dehydrated Apples | — | — | — | — | 30.0 | 7.5 |
| Walnuts | — | — | — | — | 118.2 | 29.1 |

[1] Turkish apricots - Pineapple could also be substituted.

The blended solids-binder mixture was poured onto a stainless steel cooling table, flattened and passed through a cooling tunnel (40° F.) to set the binder. After the first cooling pass, the bars were cut into one-half inch thick ×4.375×1.25 inch bars, cooled to ambient temperatures and packaged in individual metallized paper wrappings. Table III summarizes flexibility and tensile strength (elasticity) of a number of bars prepared by combining binder A of Table I with the solid ingredient mixtures of Table II.

TABLE III

| BAR PROPERTIES | | |
|---|---|---|
| Bar Type[1] Binder (Table I)/ Solids (Table II) | Flexibility[2] (Kg) | Tensile Strength[3] (Kg/cm²) |
| A/A | 16.3 | 0.38 |
| A/C | 13.9 | 0.49 |
| A/B | 7.3 | 0.19 |
| A/B(Pineapple) | 8.2 | 0.17 |

[1] All binder compositions caramelized at 250° F.; five bars tested per run.
[2] Bar placed over 1 cm gap and bent with plastic wedge until completely broken.
[3] Force required to part bar completely.

The bars remained flexible, elastic and chewy and the fruit component remained moist during storage of the wrapped bars under ambient conditions for at least six months. The solid components remained firmly bound by the binder matrix which retained substantially all of its initial plasticity.

While certain representative embodiments of the invention have been described herein for purposes of illustration, it will be apparent to those skilled in the art that modifications therein may be made without departing from the spirit and scope of the invention.

What is claimed is:

1. A process for the preparation of a food product comprising individual solid food ingredients bound together by an edible binder composition, said food product exhibiting a flexibility of about 5–20 kg and a tensile strength of about 0.1–0.6 kg/cm², said process comprising:
   (a) forming a premix comprising about 15–40% water, about 15–35% sucrose, about 0.25–1.5% lecithin and one or more non-crystallizing sugars wherein the ratio of sucrose to non-crystallizing sugar is about 1:0:0.8–3;
   (b) heating the premix to about 88°–102° F.;
   (c) blending into the heated premix about 15–30% fat having a Wiley Melt Point within the range of about 88°–102° F.;
   (d) heating the fat-containing premix to about 240°–270° F. for a period of time sufficient to lower the water to about 5–10% and to partially caramelize the non-crystallizing sugars, whereby a substantially homogeneous binder composition is formed comprising about 5–10% water, about 15–30% fat, about 0.25–1.5% lecithin, about 15–35% sucrose and one or more partially caramelized non-crystallizing sugars wherein the ratio of sucrose to partially carmelized sugar is about 1.0:0.8–8–3;
   (e) mixing the binder composition with solid food ingredients; and
   (f) cooling and dividing the bound solid food ingredients into food products of desired size and shape which exhibit a tensile strength of about 0.1–0.6 kg/cm² and a flexibility of about 5–20 kg at ambient temperatures.

2. The process of claim 1, wherein the premix of step (a) further comprises about 2–7% glycerin, and wherein the fat of step (c) is a mixture of partially hydrogenated palm kernel and soybean oil.

3. The process of claim 2, wherein the non-crystallizing sugar in the premix of step (a) is a mix of corn syrup and honey.

* * * * *